United States Patent [19]

Saka

[11] Patent Number: 4,839,731
[45] Date of Patent: Jun. 13, 1989

[54] COLOR OVERHEAD PROJECTOR
[75] Inventor: Yasuhiko Saka, Yamato, Japan
[73] Assignee: Ricoh Company, Ltd., Tokyo, Japan
[21] Appl. No.: 219,342
[22] Filed: Jul. 15, 1988
[30] Foreign Application Priority Data Jul. 15, 1987 [JP] Japan .................. 62-174804

[51] Int. Cl.[4] .............. H04N 1/23; G03B 21/00
[52] U.S. Cl. ........................... 358/296; 353/122;
353/84; 353/DIG. 3
[58] Field of Search ............... 358/296; 343/DIG. 3,
343/122, 84, 53

[56] References Cited
U.S. PATENT DOCUMENTS 4,346,449 8/1982 Ovshinsky ............... 346/76 PH
4,607,291 8/1986 Oono ..................... 358/296
4,609,779 9/1986 Rogers ................... 358/296
4,811,110 3/1989 Ohmura .................. 358/296

Primary Examiner—E. A. Goldberg
Assistant Examiner—Scott A. Rogers
Attorney, Agent, or Firm—Oblon, Spivak, McClelland, Maier & Neustadt

[57] ABSTRACT

A color overhead projector including a thermochromic film, a color filter, erasing means for erasing an image formed on the film, reading means for reading a color image to be projected, writing means for writing the color image to be projected into the film, and projecting means for projecting the color image written into the film onto a screen by illumining the film via the color filter.

6 Claims, 6 Drawing Sheets

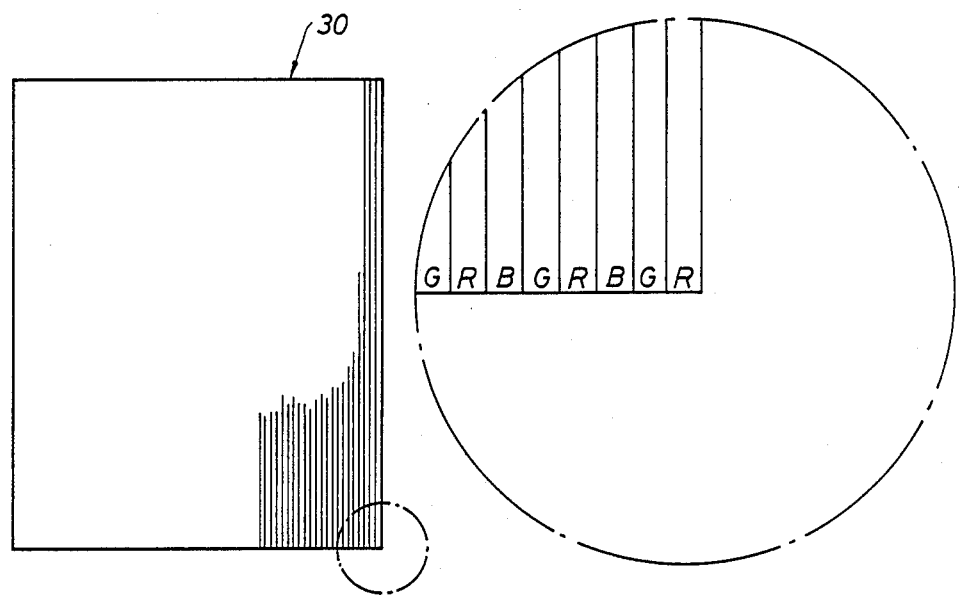

Fig.10a
Fig.10b
Fig.10c

COLOR OVERHEAD PROJECTOR

BACKGROUND OF THE INVENTION

The present invention relates to a color overhead projector which reads an image from a color document, writes the read image onto a film, and project the image onto a screen by illumining the film.

Applicants have proposed an overhead projector which writes the image read from a document onto a thermochromic film and projects the image onto a screen by causing light to transmit through the film (Japanese Patent Application No. 309334/1986).

The thermochromic film has the characteristic that it becomes optically transparent when it is heated to a first temperature, for example, of about 60° C., maintains its transparent state even if it returns to normal temperature, becomes opaque when it is heated to a second temperature, for example, of 72° C., and it maintains its opaqueness even if it is returns to its normal temperature. Therefore, if the whole film on which an image is already formed is heated to the first temperature (transparentizing temperature), the image will disappear. If the transparentized film in which the image has disappeared is heated to the second temperature selectively in accordance with the image in the original document, a new image will be formed.

Therefore, it is possible to use the same film repeatedly.

However, as described above, the image formed on a thermochromic film is composed of transparent and opaque portions, so that only a monochromatic or black and white image can be obtained on the screen.

SUMMARY OF THE INVENTION

The present invention derives from contemplation of the above problems. It is an object of the present invention to provide a color overhead projector which is capable of projecting a color image corresponding to a color document using a thermochromic film.

The object of the present invention can be achieved by a color overhead projector comprising:

a thermochromic film which becomes optically transparent when heated to a first temperature, remains transparent even when temperature of the film returns to normal temperature, becomes opaque when heated to a second temperature higher than the first temperature and remains opaque even when temperature of the film is returned to normal temperature;

a color filter comprising red, green and blue areas and disposed opposite to the film;

erasing means for erasing an image formed on the film by heating the film to the first temperature;

reading means for reading an image in a color document to be projected with color separation into red, green and blue color components;

writing means for writing the image to be projected into the film erased by the erasing means by heating areas of the film each corresponding to either of said red, green and blue areas of the filter to the second temperature in accordance with each value of said red, green and blue color components separated with respect to each other by the reading means; and projecting means for projecting the image written into the film by the writing means onto a screen by illumining the film via the color filter.

These and other features and advantages of the present invention will now be apparent from the following description of a preferred embodiment thereof by referring to the accompanying drawings.

BRIEF DESCRIPTION OF THE DRAWINGS

FIG. 2 illustrates a color filter;
FIG. 3 illustrates how to mount a color filter;
FIG. 10 shows dither matrix in a dither method for representing intermediate colors.

DETAILED DESCRIPTION OF THE PREFERRED EMBODIMENTS

A preferred embodiment of the present invention will now be described in more detail with reference to the drawings.

Figure 1:
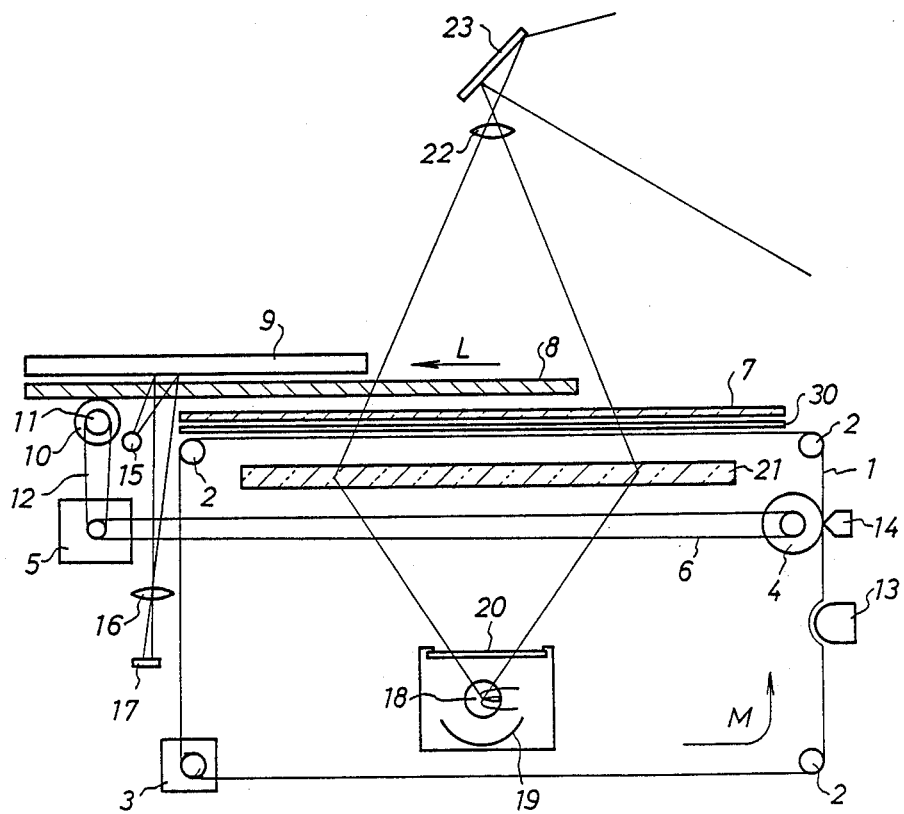
FIG. 1 is a schematic of an embodiment of the present invention.

In FIG. 1, reference numeral 1 denotes an endless thermochromic film extended around guide rollers 2. The film has the characteristic that it becomes optically transparent when it is heated to about 56°-68° C. (hereinafter, this temperature is referred to as transparentizing temperature), maintains its transparence even if the temperature of the film is returned to normal, whitened (becomes optically opaque) when it is heated to about 75° C., (hereinafter, this temperature is also referred to as whitening temperature) and maintains its opaqueness even if the temperature of the film is returned to normal. Reference numeral 3 denotes an auxiliary sending unit. A roller 4 is driven by a drive unit 5 comprising a motor and a reduction gear via a belt 6. Reference numeral 7 denotes a protective glass plate which protects the film surface; 8, a document table on which a document 9 is placed; and 10, a roller (or gear) which moves the document table 8 and includes a built-in one-way clutch 11. The roller 10 is also driven by the drive unit 5 via a belt 12.

An erasing heater 13 heats the thermochromic film 1 to its transparentizing temperature (for example, of about 60° C.) to erase an image formed on the film as the film is conveyed. A thermal head 14 applies heat corresponding to its whitening temperature (for example, of about 75° C.) to the film surface selectively in accordance with an image signal to thereby form an image on the film. The light from a document illuminating source 15 is irradiated onto the document 9 placed on the table 8, and the light reflected by the document is entered into a color image reader 17 via a focusing lens 16. Reference numeral 18 denotes a projecting lamp; 19, a collecting reflective mirror; 20, a heat-proof glass plate which absorbs infrared rays; 21, a Fresnel lens; 22, a projecting lens; and 23, a reflective mirror.

As shown in FIG. 2, a color filter 30 is divided into three color (red, green and blue) stripes so as to correspond to R (red), G (green) and B (blue) dots formed on the film 1 by the thermal head 14.

The dot density of a conventional thermal head for monochlromic image is 4 dots/mm while that according to the invention is 12 dots/mm. As shown in FIG. 3, the color filter 30 is adjusted so that the R, G and B dot positions in the thermal head 14 coincide with the positions of the R, G and B stripes. Reference numeral 31 denotes an adjusting screw for that purposes. The color filter 30 is pressed at one side thereof by a spring 32 so that the color filter abuts the adjusting screw 31 at the other side. The thermochromic film 1 is also restricted in lateral deviation by a restricting member 33. A deviation in the sending direction does not affect color shift.

Figure 4:
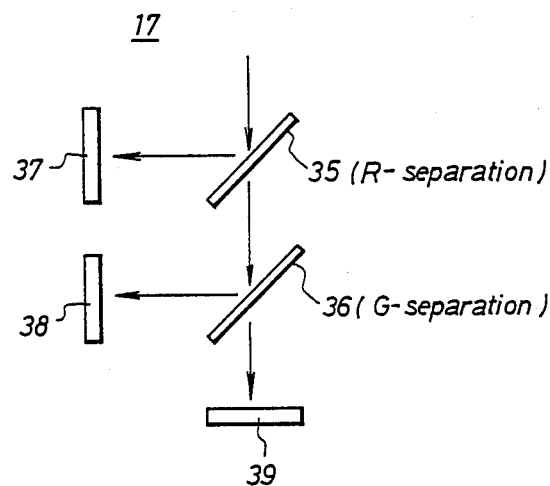
FIG. 4 is a schematic of a color image reader.
Figure 5:
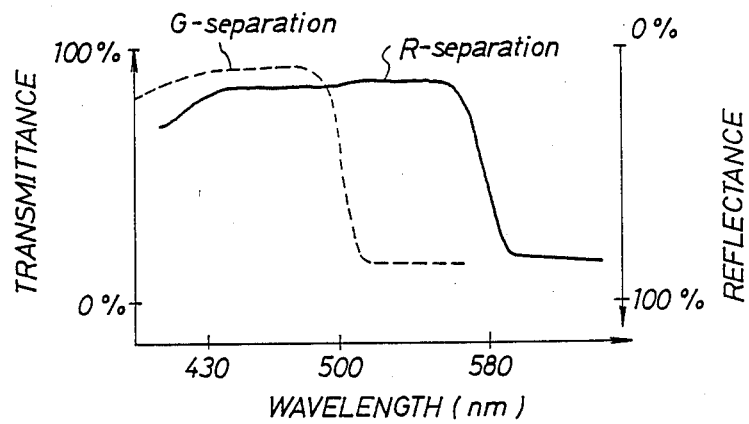
FIG. 5 is a characteristic diagram of a color separating dichroic mirror.

A conventional color image scanner may be used as the color image reader 17. As shown in FIG. 4, the light reflected by the document is first applied to a red color separating dichroic mirror 35. The mirror 35 has the characteristic shown by the solid line in FIG. 5, so that the R-component is reflected and entered into the image sensor 37 and other color components pass through the mirror. From the other color components having passed through the mirror, a green color separating dichroic mirror 36 having the characteristic shown by the broken lines in FIG. 5 reflects the G-component, and the light reflected by the mirror 36 is entered into the image sensor 38. The remaining color component (B-component) is entered into an image sensor 39. In this way, a color document image can be read by color separation into three primary color components R, G and B.

The operation of the embodiment of this invention will now be described. First, the document 9 to be projected is placed on the document table 8 manually, then the drive unit 5 moves the document table 8 in the direction of the arrow L by means of the roller 10 in the meantime the document is sequentially read by the color image reader 17. Simultaneously, the roller 4 rotates to circulate the endless thermochromic film 1 in the direction of the arrow M so that the image read by the reader 17 is instantly written by the thermal head 14 onto the thermochromic film 1. It is to be noted that, before this writing operation, a possible image on the film 1 is erased by the erasing heater 13. In this way, reading the image of the document and writing the read image onto the thermochromic film are performed simultaneously. After the writing operation is completed, the image formed on the film moves to the projecting position, and stops there. Then the projecting lamp 18 is lighted up to thereby project a desired image.

The above-described simultaneous operation including the reading by the reader 17 and the writing by the thermal head 14 will now be described in more detail. First, the reader 17 reads the image for one line by primary scanning and converts the read image for the one line to an electrical signal which is then sent as data to the thermal head 14. The thermal head 14 writes the image for the one line into the thermochromic film 1 using the data. The document table 8 and thermochromic film 1 are then forwarded by one line (secondary scanning) in preparation for reading and writing of the next one line. In this way, reading and writing are repeated line by line to thereby complete scanning of a full page.

Figure 6:
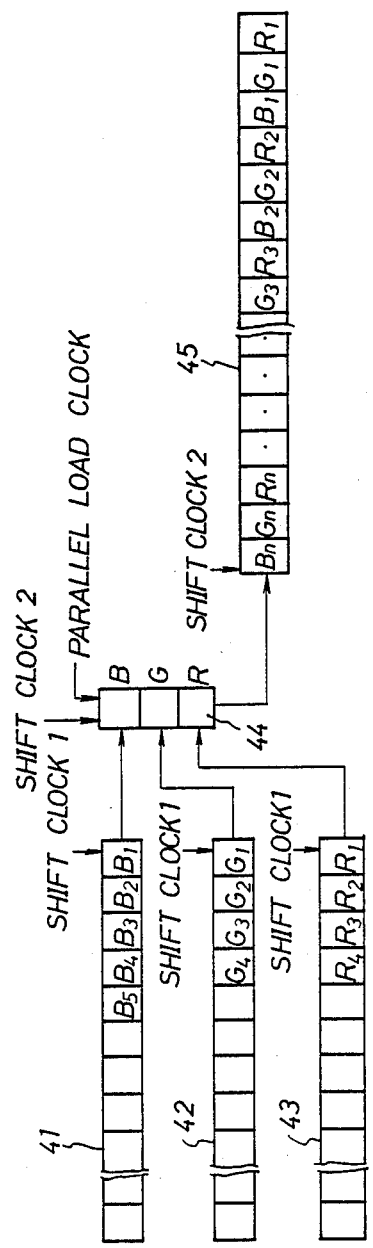
FIG. 6 illustrates how to transfer an image signal to a thermal head.
Figure 7:
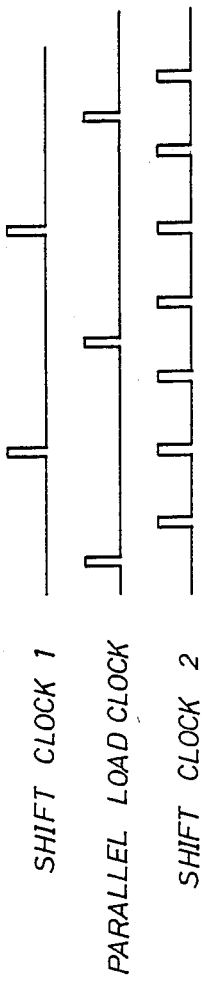
FIG. 7 illustrates the timing of the transfer.

The operation of sending color image data read by the image sensors 37, 38 and 39 of the reader 17 to the thermal head 14, and writing the data into the thermochromic film 1 will now be described more specifically. As shown in FIG. 6, the data for one line temporarily stored in shift registers 41, 42 and 43 of each image sensor are sequentially extracted one by one, and loaded into a shift register 44 in parallel. The data in the shift register 44 are then transferred in series to a shift register 45 of the thermal head 14. This transfer timing is shown in FIG. 7. At the thermal head 14, the transferred data are compared with a certain threshold. If a data is larger than the threshold, the portion of thermochromic film corresponding to the data is transparentized, whereas if a data is smaller than the threshold, the portion of thermochromic film corresponding to the data is whitened or rendered opaque.

When the reading and writing the full page are completed, the portion of the image formed corresponding to the last scanning on the film 1 is at such a position that it contacts the thermal head 14, so that it is necessary to further send the film 1. Accordingly, when the document table 8 has been sent fully, the one-way clutch 11 is actuated to forward only the film 1 for a predetermined distance so that the image for the last line formed on the film 1 reaches the projecting position, and then the drive unit 5 is stopped.

In the particular embodiment, the reading of an image in the original document, the erasing of an unnecessary image formed already on the film, and the writing of the read image onto the erased film are simultaneously performed and the image can be projected in colors immediately after the writing operation is completed.

In the particular embodiment, the color filter 30 is disposed opposite to the thermochromic film 1. It may be disposed either above or below the film. The film base itself may be constituted as a color filter in which case high technology is required and the structure of the device becomes complicated however. According to the embodiment, coping with color shift can be performed irrespective of the sending of the film, which allows the structure of the device to be very simple.

Figure 8:
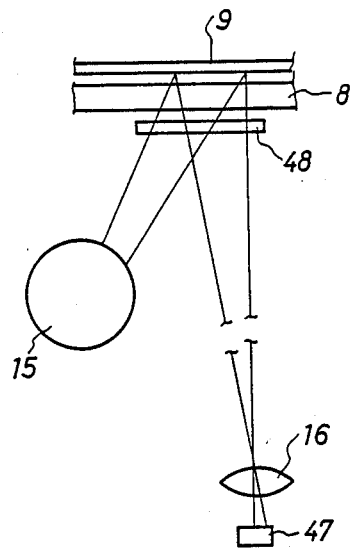
FIG. 8 is a schematic of another embodiment of the present invention.
Figure 9A:
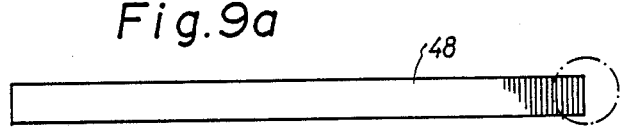
FIG. 9 illustrates a color filter of said another embodiment.
Figure 9B:
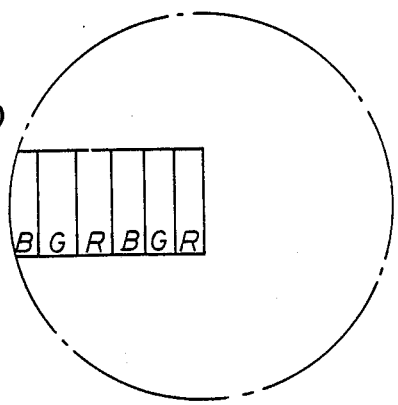

Although two dichroic mirrors and three image sensors are used in combination as the color image reader in the embodiment, it is possible to read a color document by only a single image sensor. FIG. 8 shows an embodiment of this type. Disposed below the document table 8 is a reading color filter 48 comprising R, G and B stripes arranged in the same order as the color filter 30. When an image in a document and an image to be formed on the film are the same size, it is necessary to equalize the stripe pitche of the reading color filter 48 to that of the film 1.

Intermediate colors can be represented by applying dither matrix method known as a method of representing monochromatic gradation (half tone) to each of primary colors (red, green and blue). When a plurality of sensors is used (three in FIG. 4), the dither method is applied to each sensor. If a single image sensor is to be used, a single dither matrix should have a length corresponding to the number of colors (namely, three times the length of a dither matrix for each of the three primary colors). FIG. 10(c) shows a monochromatic dither matrix. FIG. 10(a) shows a color dither matrix made on the basis of the monochromatic dither matrix. As shown in FIG. 10(b), if a matrix has different arrangements for each color, the apparent resolution will be improved.

As described above, according to the present invention, the erasing of an unnecessary image formed on the film, the reading of a desired color image from the document and the writing of the read image onto the film are performed simultaneously in a series of operations, and the image can be projected on the screen in colors.

Although the present invention has been shown and described with reference to the preferred embodiments thereof, it is not limited to the particular embodiments. Various changes and modifications could be made by those skilled in the art without departing from the scope of the present invention.

What is claimed is:

1. A color overhead projector comprising:

a film which becomes optically transparent when heated to a first temperature, remains transparent even when temperature of the film returns to normal temperature, becomes opaque when heated to a second temperature higher than the first temperature and remains opaque even when temperature of the film is returned to normal temperature;

a color filter comprising red, green and blue areas and disposed opposite to the film;

erasing means for erasing an image formed on the film by heating the film to the first temperature;

reading means for reading an image in a color document to be projected with color separation into red, green and blue color components;

writing means for writing the image to be projected into the film erased by the erasing means by heating areas of the film each corresponding to either of said red, green and blue areas of the color filter to the second temperature in accordance with each value of said red, green and blue color components separated with respect to each other by the reading means; and projection means for projecting the image written into the film by the writing means onto a screen by illumining the film via the color filter.

2. A color overhead projector according to claim 1, wherein the color filter comprises a plurality of red, green and blue stripes arranged in a predetermined order.

3. A color overhead projector according to claim 2, wherein the reading means comprises a thermal head having a plurality of heat applying dots which are adapted to heat the film to the second temperature in accordance with each value of said red, green and blue color components in said predetermined order.

4. A color overhead projector according to claim 1, wherein the first temperature is about 60° C. and the second temperature is about 72° C.

5. A color overhead projector according to claim 1, wherein the reading means comprises a color separating dichroic mirror.

6. A color overhead projector according to claim 1, wherein the writing means comprises a dither matrix for representing intermediate colors.

* * * * *